United States Patent [19]

Walker

[11] Patent Number: 5,617,624
[45] Date of Patent: Apr. 8, 1997

[54] METHOD FOR REMOVING LARGE WHEELS FROM AN AXLE

[76] Inventor: Willard H. Walker, 36739 Magnolia St., Newark, Calif. 94560

[21] Appl. No.: 484,362

[22] Filed: Jun. 7, 1995

[51] Int. Cl.$^6$ ...................................................... B23P 19/04
[52] U.S. Cl. ............................. 29/426.5; 29/245; 29/273; 7/100; 81/121.1
[58] Field of Search .............................. 29/245, 270, 273, 29/426.5, 894.3; 7/100; 81/121.1, 124.3, 124.6, 124.7

[56] References Cited

U.S. PATENT DOCUMENTS

| | | | |
|---|---|---|---|
| 1,881,029 | 10/1932 | Pfauser | 7/100 |
| 3,668,951 | 6/1972 | Talmage | 81/124.6 |
| 3,855,882 | 12/1974 | Wittmann | 81/124.7 |
| 3,973,283 | 8/1976 | Boe | 29/245 X |
| 3,996,819 | 12/1976 | King | 81/124.6 |
| 4,805,495 | 2/1989 | Tauber | 81/121.1 X |
| 5,101,695 | 4/1992 | Johnson | 81/124.6 |
| 5,168,781 | 12/1992 | Tenuta | 81/121.1 |
| 5,361,657 | 11/1994 | Terry | 81/124.6 X |
| 5,367,732 | 11/1994 | Sugg, Sr. | 7/100 |

FOREIGN PATENT DOCUMENTS

| | | | |
|---|---|---|---|
| 161353 | 2/1955 | Australia | 29/273 |
| 509491 | 1/1955 | Italy | 7/100 |
| 557220 | 12/1974 | Switzerland | 7/100 |
| 1127756 | 12/1984 | U.S.S.R. | 81/121.1 |

*Primary Examiner*—Peter Vo
*Attorney, Agent, or Firm*—Robert Charles Hill

[57] ABSTRACT

A punch tool and method for removing one or more wheels from an axle is provided. The punch comprises an elongated member having a first end configured for receiving a nut therein. The first end has an aperture dimensioned to prevent angular rotation between the aperture and the nut. The aperture has an inner periphery with a bore formed therethrough. The bore extends from the aperture towards a second end of the punch. A desired wheel to be removed is located. A plurality of lugs comprising a stud, an inner cap nut, and a nut, secure the wheels to the axle. The first end of the punch is disposed over a nut coupled to a cap nut, for coupling the punch to the nut. The cap nut may extend through the aperture and into the bore. The diameter of the bore prevents the punch from damaging the cap nut. The second end of the punch is struck with a heavy implement. The implement causes force to be applied to the nut from the punch along the longitudinal axis thereof. The transmitted force drives adjacent surfaces of the lug's components together to dislodge corrosion formed between the adjacent surfaces. After corrosion is substantially removed using the present invention, a wrench is used for removal of the desired components from the axle.

3 Claims, 3 Drawing Sheets

METHOD FOR REMOVING LARGE WHEELS FROM AN AXLE

BACKGROUND OF THE INVENTION

1. Field of the Invention

This invention relates generally to devices used to remove a wheel from a hub of an axle, and more particularly, to an improved and simplified device and method for removing one or more large wheels, such as those on a tractor-trailer, from a hub of an axle.

2. Description of Related Art

Large vehicles such as semi-tractors and trailers, class "A" recreational vehicles, and the like, typically have a pair of wheels on each hub of a support axle, such as a rear axle. The pairs of wheels are provided to support the substantial loads with which the vehicles operate. The wheels are secured to the hub by a plurality of lugs. Each lug typically includes a euclid stud that is affixed to the hub and an inner cap nut threaded onto the stud for securing the inner wheel to the hub. The outer wheel is secured to each lug by a nut.

When the inner tire of the pair has to be replaced, due a flat or wear, for example, it is often difficult to remove the inner wheel. During use, rust and corrosion forms between the two wheels, due to weather and road grime. Particularly, rust and corrosion form between the threaded interfaces of the nut and cap nut, and the cap nut and stud. The buildup of corrosion between the nut and cap nut is often greater than the buildup of corrosion between the cap nut and stud. The corrosion formed between the nut and cap nut often virtually freezes these components together.

A disadvantage of known tools for removing the wheels from the hub, such as pneumatic sockets or punches for example, is that they attempt to remove the nut or cap nut from either the cap nut or stud, prior to removing the corrosion from the threaded interface. As force is applied to the nut from the socket, the corrosion causes the socket to rotate on the nut, before the nut or cap nut break free from the threaded interface. As the socket rotates on the nut or cap nut, the edges of the nut or cap nut become rounded, thus stripping the component. Drilling or other means must then be used to remove the nut or cap nut, prior to removing the desired wheel.

A further disadvantage of pneumatic tools is that they are somewhat expensive to purchase and not easily transportable. Use of pneumatic tools at remote locations requires that the user have an impact wrench, as well as an air compressor on their vehicle for operating the impact wrench. It is well known that these devices are substantially expensive.

There therefore exists a need for a tool that can remove a nut from a corroded threaded interface with a cap nut, and remove a cap nut from a corroded threaded interface with a euclid stud without causing harm to either the components of the lug or the wheel.

OBJECTS OF THE INVENTION

It is therefore an object of the present invention to provide an improved tool for facile removal of wheels from an axle of a substantially large vehicle;

It is another object of the present invention to provide a tool that enables facile removal of threaded components of a lug securing the wheels to the axle when the components are corroded together at a threaded interface therebetween;

It is a further object of the present invention to provide a tool for facile removal of the threaded components of a lug securing a wheel to an axle that does not require the use of pneumatic equipment;

It is still another object of the present invention to provide a tool that is substantially inexpensive;

It is yet a further object of the present invention to provide a tool that enables facile removal of the threaded components of the lug without causing harm to either the components or the wheel; and It is still another object of the present invention to provide a tool that is easily transportable.

SUMMARY OF THE INVENTION

These and other objects and advantages of the present invention are achieved by providing an improved punch tool for removing components of a lug that may be corroded together, for removing one or more wheels from an axle. The punch tool of the present invention comprises an elongated cylindrical member. A first end of the punch has an aperture configured to receive a desired nut therein. The aperture is dimensioned to slip-fit onto the nut to prevent angular rotation between the aperture and the nut. The depth of the aperture is less than the depth of the nut to prevent the punch from damaging the wheel. The aperture has an inner periphery with a cylindrical bore formed therethrough. The bore extends axially from the aperture towards a second end of the punch. The diameter of the bore is greater than the diameter of an inner cap nut, to prevent the punch from damaging the cap nut when the punch is in use. The length of the bore is sufficient to receive the inner cap nut.

The invented punch can be used to remove either an inner or outer wheel, or both. If an outer wheel is being removed in addition to an inner wheel, the first end of the punch is disposed over a nut coupled to an inner cap nut of the lug, for coupling the punch to the nut. The second end of the punch is then struck with a substantially heavy implement, such as a sledge hammer for example. The second end of the punch is struck in substantial alignment with the longitudinal axis of the punch, to transmit force applied to the punch from the hammer, to the components of the lug. The force from the hammer is transmitted from the punch to the nut, from the nut to the inner wheel, from the inner wheel to a beveled flange of the inner cap nut, and from the inner cap nut to the inner wheel. The transmitted force drives adjacent surfaces of the lug's components together to dislodge corrosion formed between the adjacent surfaces. After the corrosion is removed using the invented punch, a suitable wrench is then used to remove the nut from the cap nut.

For removing the inner wheel, a nut is threaded onto the desired inner cap nut until the nut is tight against a flange of the cap nut. The first end of the punch is disposed over the cap nut. As the punch passes over the cap nut, the cap nut extends through the aperture and into the bore. The diameter of the bore is greater than the diameter of the cap nut to prevent the punch from harming the cap nut when the punch is being struck by the hammer. The length of the bore enables the cap nut to be received in the bore. The punch is coupled to the nut, then struck as before, until the corrosion between the threaded interface of the cap nut and stud is dislodged. The cap nut is removed from the stud using a suitable wrench. The process is repeated until the wheel can be removed from the hub.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein.

Figure 1:
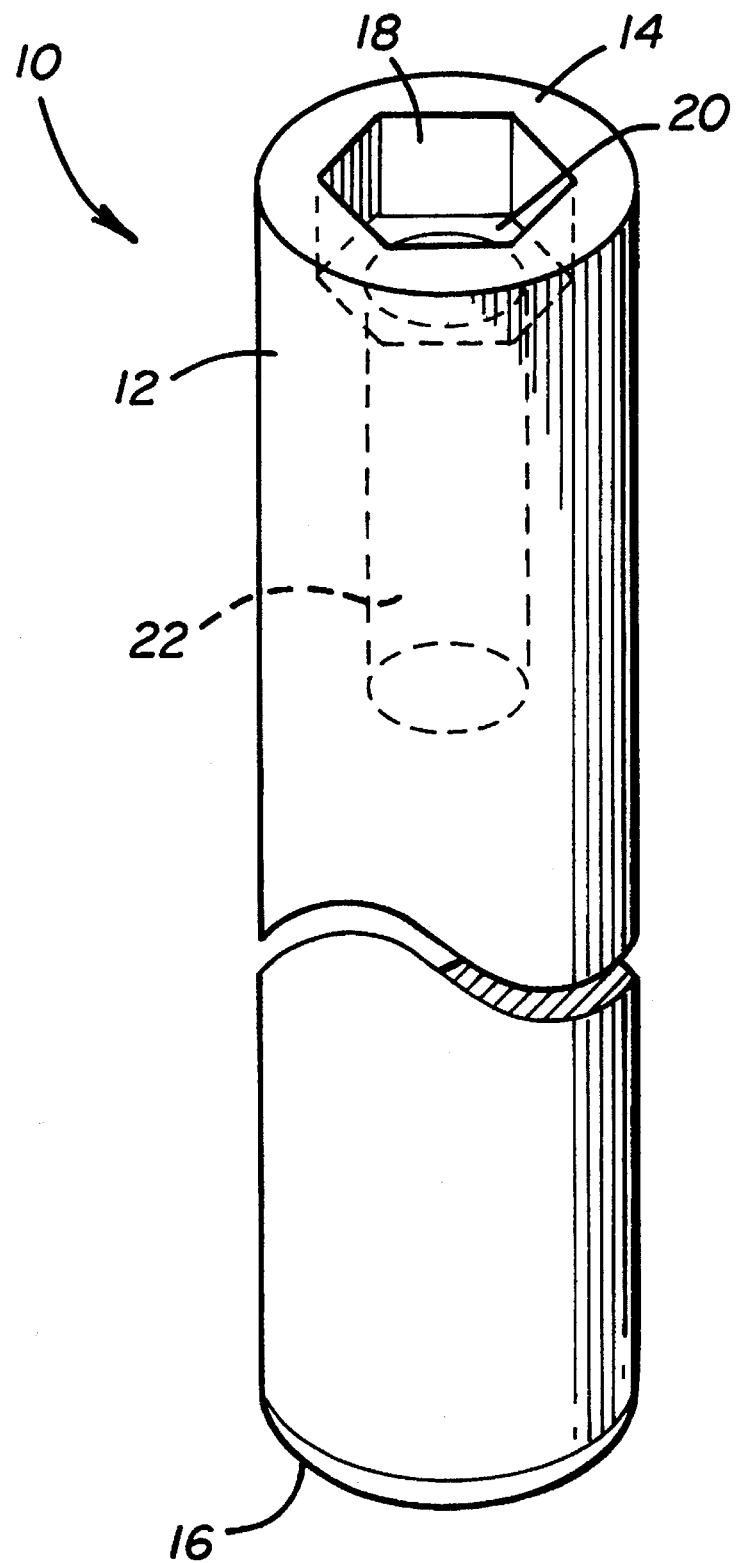
FIG. 1 is a perspective view of a preferred embodiment of the present invention shown partially in phantom.

Referring now to FIG. 1 of the drawings, there is shown a preferred embodiment of the invented punch tool 10, constructed according to the principles of the present invention. The invented punch 10 comprises an elongated body member 12 that has a first end 14 and a second end 16. In the preferred embodiment 10, the body 12 is cylindrical but alternative, suitable configurations, such as rectangular or hexagonal for example, are anticipated by the present invention. In the preferred embodiment, the body 12 ranges from eight inches to ten inches in length, and approximately 2¼ inches in diameter. The invented punch 10 comprises a suitable strong, impact-resistant material, such as steel alloy, for example.

The first end 14 of the body 12 has an aperture 18 formed therethrough. The aperture 18 is configured to receive a desired nut therein for coupling the punch 10 to the nut (shown in FIGS. 2 and 3). The aperture 18 has an inner shoulder 20 with a bore 22 formed therethrough. The bore 22 extends from the shoulder 20 of the aperture 18 towards the second end 16 of the body 12. The diameter of the bore 22 is greater than the diameter of a desired inner cap nut of a wheel lug (discussed hereafter), to inhibit the punch 10 from damaging the cap nut. The length of the bore 22 enables an inner cap nut to be disposed in the bore 22.

Figure 2:
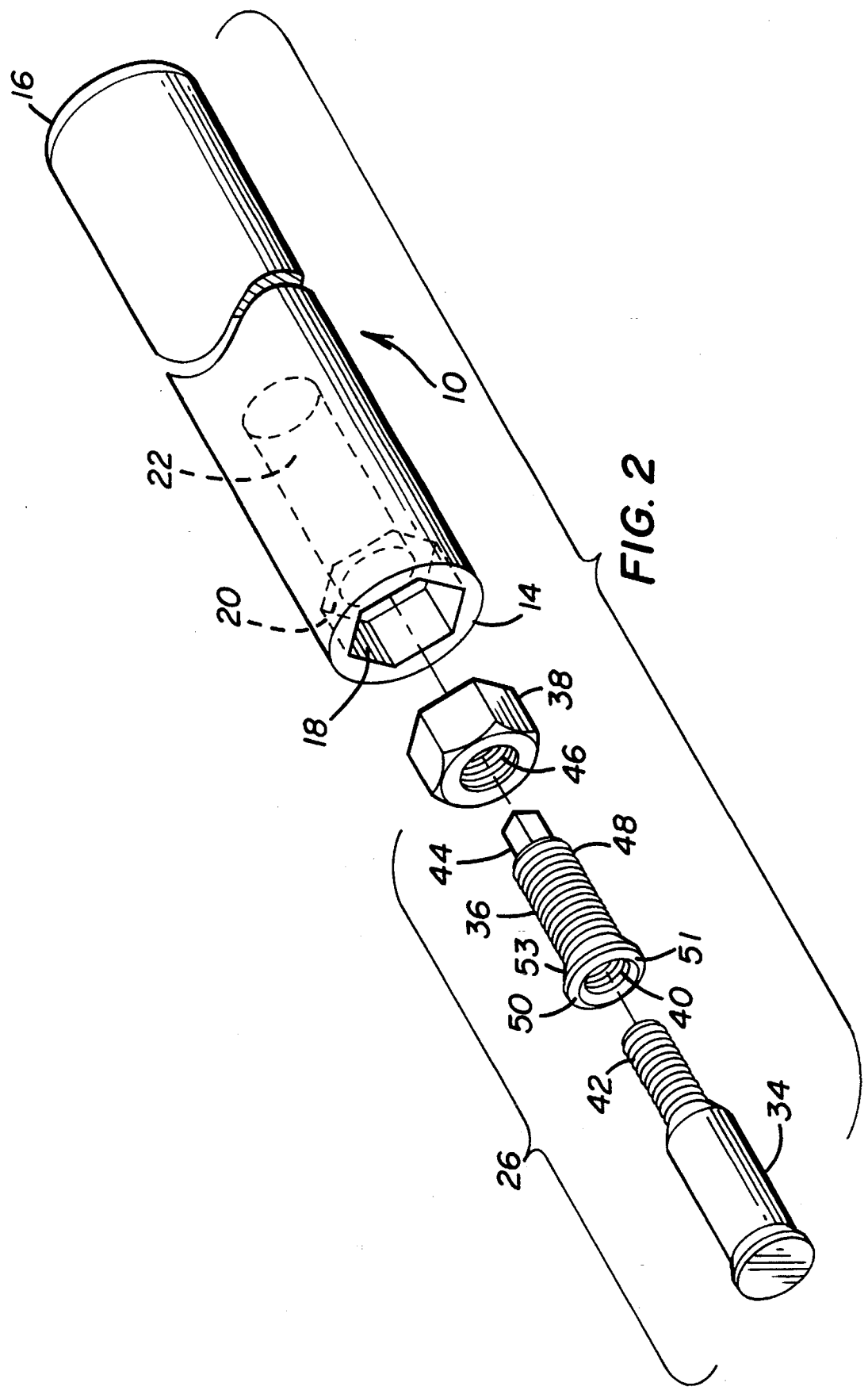
FIG. 2 is an exploded perspective view showing the present invention and components of a lug of hub.
Figure 3:
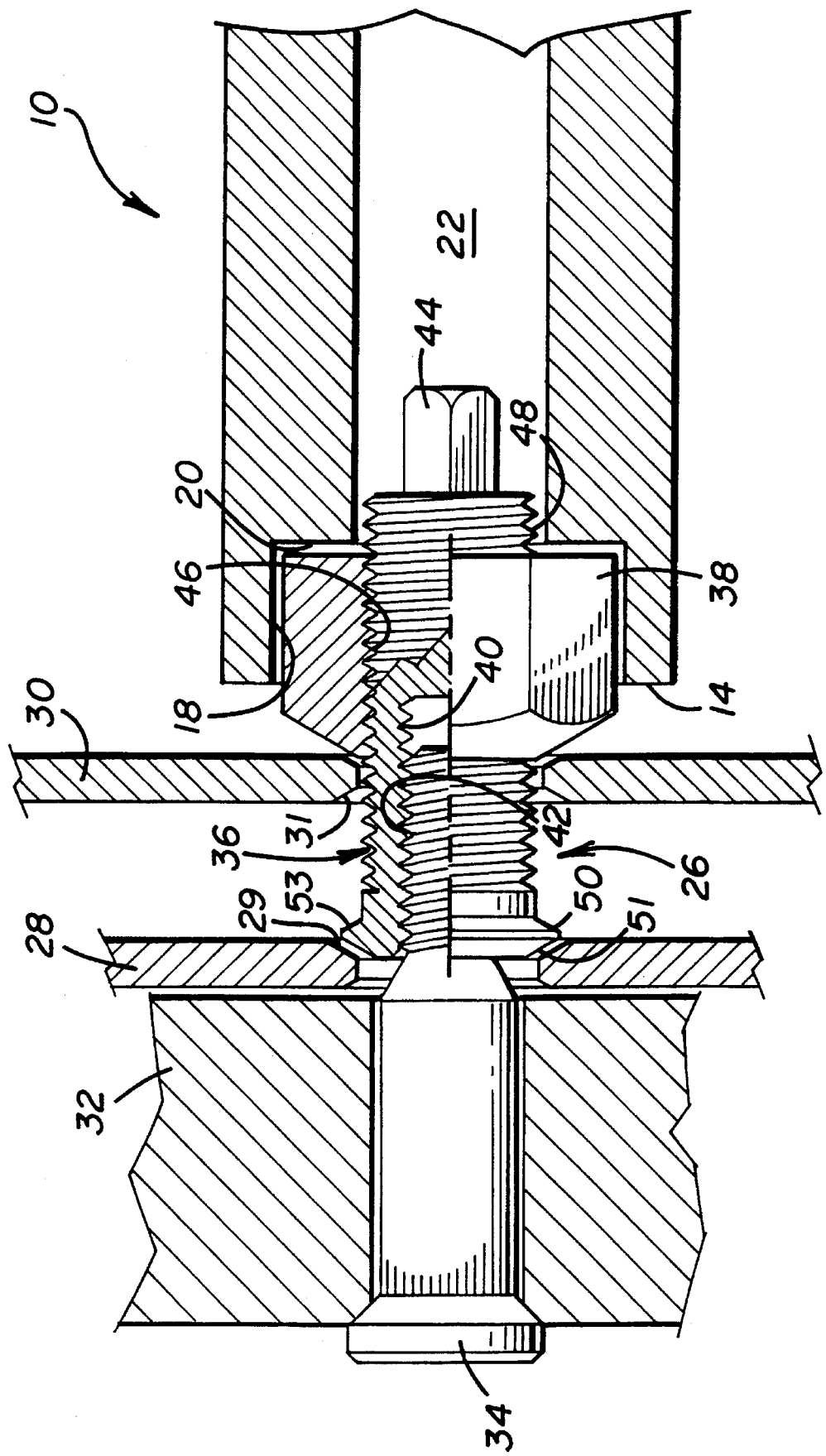
FIG. 3 is a cross sectional, fragmentary view showing the preferred embodiment of the present invention coupled to a lug securing a pair of wheels to a hub.

Referring now to FIG. 2 and FIG. 3 of the drawings, a plurality of lugs 26 (only one is shown), are used to secure an inner wheel 28 and an outer wheel 30 to a hub 32 of an axle (not shown). The lug 26 comprises a euclid stud 34 affixed to the hub 32, an inner cap nut 36 coupled to the stud 34, and a nut 38 coupled to the cap nut 36. The nut 38 threads onto the cap nut 36 for securing the outer wheel 30 to the hub 32, while the cap nut 36 secures the inner wheel 28 to the hub 32. The cap nut 36 has a threaded inner periphery 40 that mates with a threaded outer periphery 42 of the stud 34. The nut 38 has a threaded inner periphery 46 that mates to a threaded outer periphery 48 of the cap nut 36.

The cap nut 36 is provided with a head portion 44 for rotating the cap nut 36, to thread the cap nut 36 onto the stud 34. The cap nut 36 is further provided with a beveled flange 50 for securing the inner wheel 28 to the stud 34. The wheels 28, 30 are secured to the hub 32, by first placing the inner wheel 28 onto the lug 26. The cap nut 36 is then threaded onto the stud 34, until the flange 50 is tight against the inner wheel 28, to secure the wheel to the hub 32. The outer wheel 30 is placed on the lug 26 and the nut 38 is threaded onto the cap nut 36 to secure the wheel 30 to the hub 32.

During use, corrosion and road grime (both not shown) form between the inner periphery 46 of the nut 38 and the outer periphery 48 of the cap nut 36. Corrosion may also form between the outer periphery 42 of the stud 34 and the inner periphery 40 of the cap nut 36. Further, over time a beveled edge 29 of the inner wheel 28 may substantially bond against a complementary beveled surface 51 of the flange 50, and a beveled edge 31 of the outer wheel 30 may bond against a complementary beveled surface 53 of the flange 50. The adjacent surfaces 29, 51 of the inner wheel 28 and flange 50, and the adjacent surface 31, 53 of the outer wheel 30 and flange 50 may bond together due to various well known circumstances. In time, buildup of corrosion between the threaded surfaces 40, 42, 46, 48 virtually freezes the nut 38 to the cap nut 36, and may freeze the cap nut 36 onto the stud 34.

The wheels 28, 30 are removed from the hub 32 using the invented punch 10, by disposing the first end 14 over the nut 38, until the nut 38 abuts the shoulder 20. The aperture 18 is dimensioned to slip-fit over the nut 38, to prevent relative slippage between the nut 38 and punch 10. The depth of the aperture 18 is less than the depth of the nut 38. Thus, the nut 38 and wheels 28, 30 are not damaged by the punch 10 when force is applied to the nut 38.

A substantially heavy implement, such as a sledge hammer (not shown) is used to strike the punch 10. The implement is struck against the second end 16 of the punch 10 in substantial alignment with the longitudinal axis of the punch 10. The length of the punch 10, enables the second end 16 to be struck, without interference from the hub 32 or wheel 28, 30. The force of the hammer striking the punch's second end 16, forces the shoulder 20 against the nut 38. The force from the hammer is transmitted from the nut 38 to the outer wheel 30, to the flange 50 from the outer wheel 30, then from the flange 50 to the inner wheel 28.

Further, force is transmitted from the beveled edge 31 of the outer wheel 30 to the complementary beveled surface 53 of the flange 50, then from the beveled surface 51 of the flange 50, to the complementary beveled edge 29 of the inner wheel 28. The transmitted force drives the adjacent beveled surface 31, 53 of the outer wheel 30 and flange 50, and adjacent beveled surfaces 29, 51 of the inner wheel 28 and flange 50, together to break the bond therebetween, and to dislodge corrosion formed between the threaded surfaces 40, 42, 46, 48.

Once the nut 38 and cap nut 36 are substantially corrosion free, a suitable wrench (not shown) is used to remove the nut 38 from the cap nut 36. The invented punch 10 may also be rotated, to remove the nut 38 from the cap nut 36. This process is repeated until each nut 38 is removed from each cap nut 36, so that the outer wheel 30 can be removed.

The inner wheel 28 is removed, by first threading the nut 38 onto the desired cap nut 36, until the nut 38 is tight against the flange 50 of the cap nut 36. The first end 14 of the punch 10 is disposed over the threaded periphery 48 of the cap nut 36. As the first end 14 is slid over the cap nut 36, the cap nut 36 extends through the aperture 18 and into the bore 22. The first end 14 is slid over the cap nut 36 until the nut 38 abuts the shoulder 20. A large portion of the cap nut 36 extends into the bore 22 when a portion of the nut 38 is residing in the aperture 18. The diameter of the bore 22 prevents the punch 10 from damaging the cap nut 36, when the punch 10 is struck by the hammer.

After the punch 10 is coupled to the nut 38, the punch 10 is struck by the hammer as previously discussed. The punch 10 transmits force applied to the second end 16 thereof to the nut 38. The force of the punch 10 hitting against the nut 38, dislodges corrosion formed between the threaded peripheries 40, 42 of the cap nut 36 and stud 34 as previously discussed. The punch 10 is struck by the hammer until the threaded peripheries 40, 42 of the cap nut 36 and stud 34 are substantially free of corrosion. If some corrosion still remains between the cap nut 36 and stud 34, the hammer may be used to lightly tap the punch 10 back and forth to free the remaining corrosion. The punch 10 may then be rotated to loosen the nut 38 on the cap nut 36. Alternatively, the punch 10 can be removed and may suitable means can be used to remove the nut 38 and cap nut 36 from the stud 34. The inner wheel 28 is then removed from the hub 32.

Thus, there has been described an improved simplified punch for removing one or more wheels from a hub of an axle. The present invention is used to remove corrosion from the components of the lug, so that the wheels can be removed without causing harm to the lug's components. The invented punch is substantially small and portable, so that it can be transported for use in remote locations where it may be most advantageously used.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for removing a pair of wheels from a hub of an axle, said wheels mounted to said hub by a plurality of lugs, each of said lugs comprising a stud affixed to said hub, a cap nut coupled to said stud for securing an inner wheel to said hub, and a nut coupled to said cap nut for securing an outer wheel to said hub, said method comprising the steps of:

(a) providing a punch comprising an elongated cylinder having a first end and a second end, the first end of said punch having an aperture configured to receive a desired nut therein, said aperture having a depth less than the depth of said nut and an inner shoulder with a bore formed therethrough, said bore extending axially from said aperture towards the second end of said punch, the diameter of said bore being greater than the diameter of said cap nut;

(b) disposing the first end of said punch about a desired nut coupled to an associated cap nut to couple said punch to said nut;

(c) striking the second end of said punch with a substantially heavy implement in substantial axial alignment with the longitudinal axis thereof for transmitting force from said punch to said nut, said force driving said nut against the outer wheel, the outer wheel against a flange of said cap nut, said flange against the inner wheel, and said inner wheel against said hub to dislodge corrosion formed between adjacent surfaces thereof;

(d) removing said nut from the associated cap nut using a wrench;

(e) repeating steps b though d until each nut is removed from each cap nut;

(f) removing the outer wheel;

(g) threading a nut onto a desired cap nut until said nut is tight against a flange on said cap nut;

(h) disposing the first end of said punch about said nut to couple said punch to said nut, such that said cap nut extends through said aperture and into said bore;

(i) striking the second end of said punch with the substantially heavy implement in substantial axial alignment with the longitudinal axis thereof for transmitting force from said punch to said nut, said force driving said nut against said cap nut, said flange against the inner wheel, and said inner wheel against said hub to dislodge corrosion formed between adjacent surfaces thereof;

(j) removing said nut from said cap nut and removing said cap nut from said stud using said wrench;

(k) repeating steps h through j until each cap nut is removed from each stud; and (l) removing the inner wheel from said hub.

2. The method of claim 1 wherein said substantially heavy implement of steps c and i comprises a sledge hammer.

3. The method of claim 1 wherein said aperture is dimensioned to slip-fit onto said nut for preventing angular rotation therebetween when said punch is struck by said implement.

\* \* \* \* \*